United States Patent
Herald et al.

(10) Patent No.: US 9,964,175 B2
(45) Date of Patent: May 8, 2018

(54) HEAT AND VIBRATION MOUNTING ISOLATOR FOR A HEAT SHIELD, HEAT SHIELD ASSEMBLY AND METHOD OF CONSTRUCTION THEREOF

(71) Applicant: Federal-Mogul Corporation, Southfield, MI (US)

(72) Inventors: John Herald, Canton, MI (US); David M. Toth, Brighton, MI (US)

(73) Assignee: Federal-Mogul LLC, Southfield, MI (US)

( * ) Notice: Subject to any disclaimer, the term of this patent is extended or adjusted under 35 U.S.C. 154(b) by 0 days. days.

(21) Appl. No.: 15/134,568

(22) Filed: Apr. 21, 2016

(65) Prior Publication Data

US 2016/0312852 A1    Oct. 27, 2016

Related U.S. Application Data

(60) Provisional application No. 62/260,039, filed on Nov. 25, 2015, provisional application No. 62/152,730, filed on Apr. 24, 2015.

(51) Int. Cl.
*F16F 15/06* (2006.01)
*F01N 13/14* (2010.01)
(Continued)

(52) U.S. Cl.
CPC ............... *F16F 15/06* (2013.01); *B21D 5/00* (2013.01); *B23P 15/26* (2013.01); *F01N 13/14* (2013.01);
(Continued)

(58) Field of Classification Search
CPC ......... Y10T 428/218; Y10T 428/24322; F01N 13/1838; F01N 13/1855; F16B 5/0241
See application file for complete search history.

(56) References Cited

U.S. PATENT DOCUMENTS 7,065,963 B2    6/2006  Niwa
7,155,903 B2    1/2007  Ishiwa
(Continued)

FOREIGN PATENT DOCUMENTS

EP    1281876 A1    2/2003
JP    2015004291 A    1/2015
KR    20140075179 A    6/2014

OTHER PUBLICATIONS

International Search Report, dated Jul. 1, 2016 (PCT/US2016/028727).

*Primary Examiner* — Alexander Thomas
(74) *Attorney, Agent, or Firm* — Robert L. Stearns; Dickinson Wright, PLLC (57) ABSTRACT

An isolator for damping heat and vibrations between a heat shield and heat source is provided. The isolator includes a housing and a washer. The housing surrounds a center opening and extends axially from a first end portion to a second end portion and includes an intermediate portion therebetween. The housing has a serpentine shape. The first end portion and the intermediate portion of the housing clamp a washer therebetween, and the second end portion and the intermediate portion of the housing clamp the heat shield therebetween. The washer includes a plurality of through openings between an outer periphery and the center opening for enhancing vibration dampening and minimizing heat transfer from the heat source to the heat shield. The isolator optionally includes a collar member disposed along the center opening of the washer to facilitate mounting of the isolator to the heat source.

19 Claims, 11 Drawing Sheets (51) Int. Cl.
  *F01N 13/18* (2010.01)
  *B21D 5/00* (2006.01)
  *B23P 15/26* (2006.01)
  *F01N 3/20* (2006.01)
  *F01N 13/08* (2010.01)

(52) U.S. Cl.
  CPC ..... *F01N 13/1838* (2013.01); *F01N 13/1855* (2013.01); *F01N 3/20* (2013.01); *F01N 13/08* (2013.01); *F01N 2260/20* (2013.01); *F01N 2450/24* (2013.01)

(56) References Cited

U.S. PATENT DOCUMENTS

| | | |
|---|---|---|
| 7,273,128 B2 | 9/2007 | Niwa et al. |
| 7,284,748 B2 | 10/2007 | Mishima |
| 7,784,585 B2 | 8/2010 | Greenwood |
| 8,104,573 B2 | 1/2012 | Oxenknecht et al. |
| 8,899,376 B2 | 12/2014 | Akimoto |
| 9,133,869 B2 | 9/2015 | Friedow et al. |
| 2007/0252316 A1 | 11/2007 | Mishima |

HEAT AND VIBRATION MOUNTING ISOLATOR FOR A HEAT SHIELD, HEAT SHIELD ASSEMBLY AND METHOD OF CONSTRUCTION THEREOF

CROSS-REFERENCE TO RELATED APPLICATION

This U.S. Utility patent application claims priority to U.S. Provisional Patent Application No. 62/152,730, filed Apr. 24, 2015, and U.S. Provisional Patent Application No. 62/260,039, filed Nov. 25, 2015, the entire contents of which are incorporated herein by reference.

BACKGROUND OF THE INVENTION

1. Technical Field

This invention relates generally to heat shields, and more particularly to a mounting and vibration dampening apparatus for mounting a heat shield.

2. Related Art

Vehicles and other equipment that operate via an internal combustion engine contain various components that create extremely high temperature heat. If left unchecked, the heat from the components can have adverse affects on surrounding components. For example, an automotive vehicle has an exhaust system including exhaust pipes and catalytic converters which can reach temperatures between 800-1200° Fahrenheit (° F.) or more. As such, it is known to place a thermal barrier, often referred to simply as a heat shield, adjacent the exhaust pipes and/or catalytic converter to prevent radiant heat from impinging adjacent components and from entering a passenger compartment of the vehicle. In addition, heat shields are often used within an engine compartment of the vehicle to prevent radiant heat from having adverse affects on surrounding components, electrical lines, and hoses, for example, wherein elevated temperatures are becoming more commonplace due modern engine packages creating cramped environments.

Accordingly, heat shields are becoming increasingly important products for insulating the heat, sound and vibration of automobile engines, electric generator engines, parts of exhaust pipes, amongst numerous other applications. Such multi-functional heat and vibration dampening shields must often fit into a relatively small space while providing high performance to protect the surrounding parts. Heat shields typically comprise one or more layers of material that must be fixed and maintained in position by a mounting bracket. The mounting bracket not only plays an important role in fixing the heat shield in position, but is also intended to inhibit the transfer of heat from the heat source to the heat shield, as well as to dampen vibration. Known mounting brackets can be complex in construction; relatively bulky and heavy, which in turn adds cost and weight to the vehicle, and further, can allow heat and vibration to affect the performance of the vehicle. More so than ever, cost, weight and performance are main concerns in the production of vehicles, and thus, improvements to positively impact each concern are continually sought.

SUMMARY OF THE INVENTION

One aspect of the invention provides an isolator for damping heat and vibrations between a heat shield and heat source without a complex construction and without adding significant volume, cost, or weight to the vehicle. The isolator includes a housing surrounding a center opening and extending axially from a first end portion to a second end portion and including an intermediate portion therebetween. The first end portion of the housing extends radially inwardly to form a first annular pocket between the first end portion and the intermediate portion. The second end portion of the housing extends radially outwardly to form a second annular pocket between the second end portion and the intermediate portion. The first annular pocket faces the center opening, and the second annular pocket faces away from the center opening for receiving the heat shield. A washer extends radially from an outer periphery received in the first annular pocket of the housing to the center opening for receiving a fastener to connect the heat shield to the heat source. The washer also includes a plurality of through openings between the outer periphery and the center opening for enhancing vibration dampening and minimizing heat transfer from the heat source to the heat shield.

Another aspect of the invention includes a heat shield assembly for attachment to a heat source by a fastener. The assembly comprises a heat shield including a through opening presented by an inner periphery; and an isolator received in the through opening of the heat shield for damping heat and vibrations between the heat shield and the heat source. The isolator comprises a housing surrounding a center opening, and the center opening is axially aligned with the through opening of the heat shield. The housing extends axially from a first end portion to a second end portion and includes an intermediate portion therebetween. The first end portion of the housing extends radially inwardly to form a first annular pocket between the first end portion and the intermediate portion. The second end portion of the housing extends radially outwardly to form a second annular pocket between the second end portion and the intermediate portion. The first annular pocket faces the center opening, and the annular pocket faces away from the center opening and receives the inner periphery of the heat shield. A washer extending radially from an outer periphery received in the first annular pocket of the housing to the center opening for receiving the fastener to connect the heat shield to the heat source. The washer includes a plurality of through openings between the outer periphery and the center opening for enhancing vibration dampening and minimizing transfer of heat from the heat source to the heat shield.

A method of manufacturing an isolator for damping heat and vibrations between a heat shield and heat source is also provided. The method comprises the step of: providing a washer extending radially from an outer periphery to a center opening, the washer including a plurality of through openings between the outer periphery and the center opening for enhancing vibration dampening and minimizing heat transfer from the heat source to the heat shield; and providing a housing surrounding a center opening, the housing extending from a first end portion to a second end portion and including an intermediate portion therebetween. The method further includes bending the housing so that the first end portion extends radially inwardly; disposing the outer periphery of the washer between the first end portion and the intermediate portion of the housing; and bending the housing so that the second end portion extends radially outwardly to form an annular pocket between the second end portion and the intermediate portion, the second annular pocket facing away from the center opening for receiving the heat shield.

The invention also provides a method of manufacturing a heat shield assembly. The method includes providing a washer extending radially from an outer periphery to a center opening for receiving a fastener to connect the heat shield assembly to the heat source, the washer including a plurality of through openings between the outer periphery and the center opening for enhancing vibration dampening and minimizing heat transfer from the heat source to the heat shield; and providing a housing surrounding a center opening, the housing extending from a first end portion to a second end portion and including an intermediate portion therebetween. The method further includes bending the housing so that the first end portion extends radially inwardly; disposing the outer periphery of the washer between the first end portion and the intermediate portion of the housing; bending the housing so that the second end portion extends radially outwardly; and disposing an inner periphery of a heat shield between the second end portion and the intermediate portion of the housing.

BRIEF DESCRIPTION OF THE DRAWINGS

These and other features and advantages of the present invention will become more readily appreciated when considered in connection with the following detailed description of presently preferred embodiments and best mode, appended claims and accompanying drawings, in which:

DETAILED DESCRIPTION OF EXAMPLE EMBODIMENTS

Figure 1:
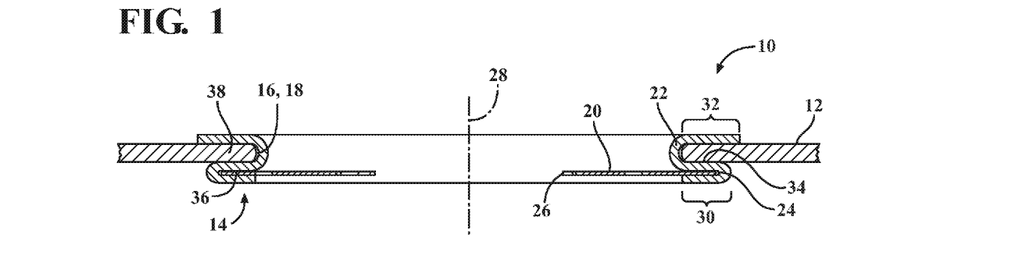
FIG. 1 is a an assembled, cross-sectional side view of a heat shield assembly constructed according to one presently preferred embodiment of the invention.
Figure 2:
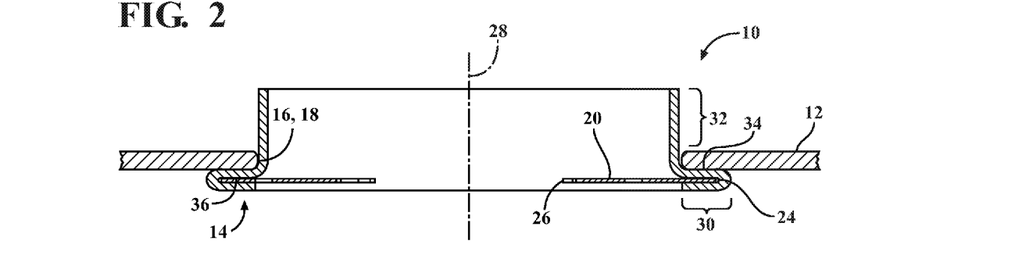
FIG. 2 is view similar to FIG. 1 of the heat shield assembly in a partially assembled state.
Figure 3:
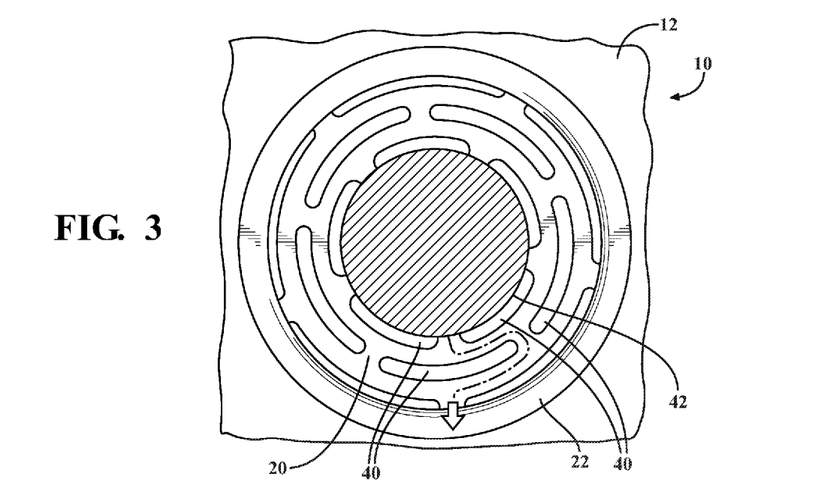
FIG. 3 is a plan view of the heat shield assembly of FIG. 1.

Referring in more detail to the drawings, FIG. 1-3 (FIG. 2 is partially assembled) show a heat shield assembly, referred to hereafter as assembly 10, constructed in accordance with one presently preferred embodiment of the invention. The assembly 10 is constructed to enhance sound insulation in a manner of vibration dampening, to minimize weight, to minimize conductivity of heat from a heat source throughout the assembly 10, and to occupy as small an envelope as possible. The assembly 10 has a broad array of applicable uses, such as in vehicles having internal combustion engines, construction machinery, and agricultural machinery, by way of example and without limitation. Further, the assembly 10 is economical in manufacture and in assembly and exhibits a long life in use.

The assembly 10 includes a heat shield 12 and a heat and vibration mounting isolator, referred to hereafter as isolator 14, fixed to one another. The heat shield 12 can be constructed from one or more layers of material, as desired, and can take on any size, shape and configuration, as desired for the intended application. The heat shield 12 if provided with a through opening 16 that is bounded by an inner periphery 18 to facilitate fixing the isolator 14 thereto. The isolator 14 includes a washer 20 and an annular housing 22, also referred to as a strainer. The washer 20 has an outer periphery 24 and a center opening 26 extending about a central axis 28. The annular housing 22 extends about the central axis 28 through the through opening 16 of the heat shield 12. The annular housing 22 has opposite first and second end portions 30, 32 and an intermediate portion 34 extending between the first and second end portions 30, 32. The first end portion 30 is curled radially inwardly toward the central axis 28 in overlying relation with the intermediate portion 34 to form a first annular pocket 36 opening toward the central axis 28. The first annular pocket 36 is bounded on opposite sides by the intermediate portion 34 and the first end portion 30, and the outer periphery 24 of the washer 20 clamped or in other words sandwiched between the first end portion 30 and the intermediate portion 34 and fixed in the first annular pocket 36. The second end portion 32 is curled radially outwardly away from the central axis 28 in overlying relation with the intermediate portion 34 to form a second annular pocket 38 opening away from the central axis 28. The second annular pocket 38 is bounded on opposite sides by the intermediate portion 34 and the second end portion 32, and the inner periphery 18 of the heat shield 12 is clamped or in other words sandwiched between the second end portion 32 and the intermediate portion 34 and is fixed in the second annular pocket 38. As such, the heat shield 12 and isolator 14 are permanently fixed to one another. The washer 20 of the heat shield assembly 10 is then attached to the heat source, such as the exhaust pipe or catalytic converter, by a fastener 42. The fastener 42 can be a bolt, a screw, or another type of fastening device. Preferably, the washer 20 is at zero mean stress and will have an applied load under vibration that modulates above and below this mean. The washer 20 is typically close to a flat profile, which helps to maximum the strength of the metal material used to form the washer 20, due to the material not being worked to form its shape. A high yield strength of the washer 20 maximizes fatigue life.

The washer 20 of the heat shield assembly 10 is preferably constructed of steel, and more preferably stainless steel; however, it is contemplated that other metals could be used, such as aluminum, for example. The washer 20 can be provided with a plurality of through openings 40 between the outer periphery 24 and the center opening 26 to enhance vibration dampening, to minimize weight, and to minimize conductivity of the washer 20 to minimize the transfer of heat from a heat source to the heat shield 12, such as via the fastener 42 that fastens the assembly 10 to a mount location on or adjacent the heat source, such as to portions of an exhaust system, for example. It should be recognized that the through openings 40 can be formed having any number of shapes and sizes, such as demonstrated in alternate embodiments constructed in accordance with the invention illustrated in FIGS. 5-12, wherein the same reference numerals, offset by factors in increments of 100's, are used to identify like features.

Figure 12:
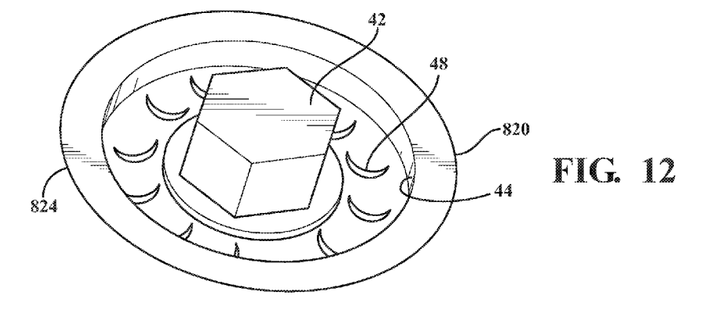
FIG. 12 is a perspective view of a washer of a heat and vibration mounting isolator constructed in accordance with another aspect of the invention.
Figure 13:
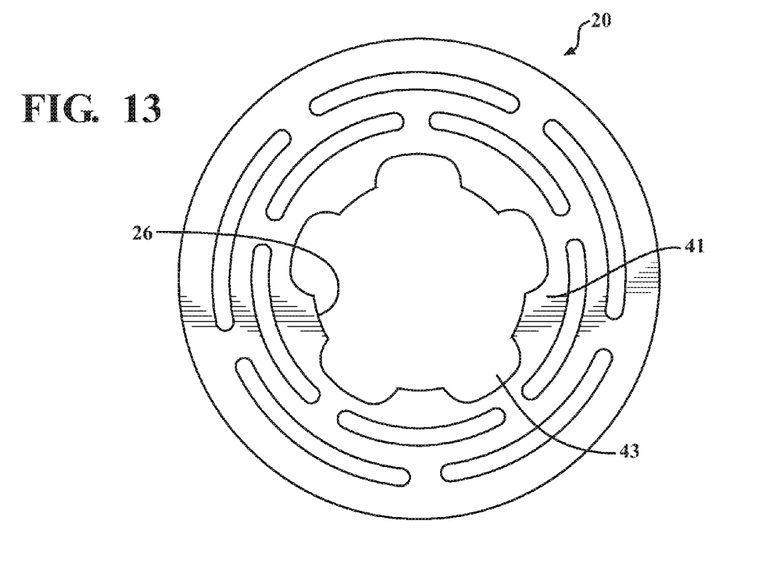
FIG. 13 is a top view of a washer including a non-circular inner diameter presenting a center opening constructed in accordance with another aspect of the invention.
Figure 14:
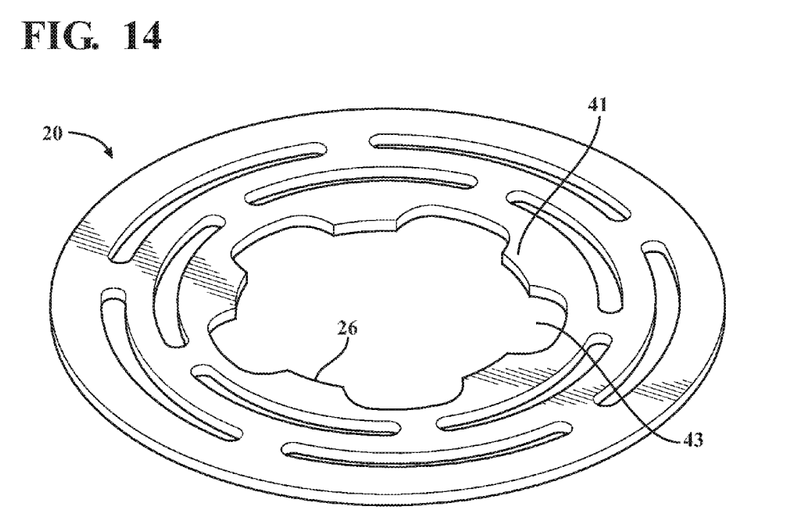
FIG. 14 is a perspective view of the washer of FIG. 13.
Figure 15:
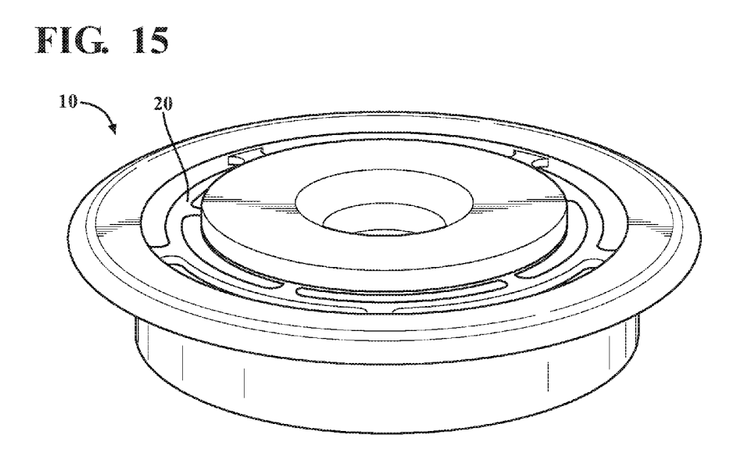
FIG. 15 is a perspective view of a heat and vibration mounting isolator including the washer of FIG. 13.

In the examples of FIGS. 1-12, the washer 20 presents a circular inner diameter defining the center opening 26. However, the washer 20 could alternatively include a non-circular inner diameter defining the center opening 26. For example, the washer 20 could include a plurality of tabs 41 surrounding and defining the center opening 26, wherein each tab 41 is spaced from the adjacent tab by a groove 43. FIGS. 13 and 14 illustrate an example of the washer 20 including the tabs 41 and grooves 43 defining the non-circular inner diameter. FIG. 15 illustrates the washer 20 with the non-circular inner diameter disposed between other components of the heat shield assembly 10.

Figure 4:
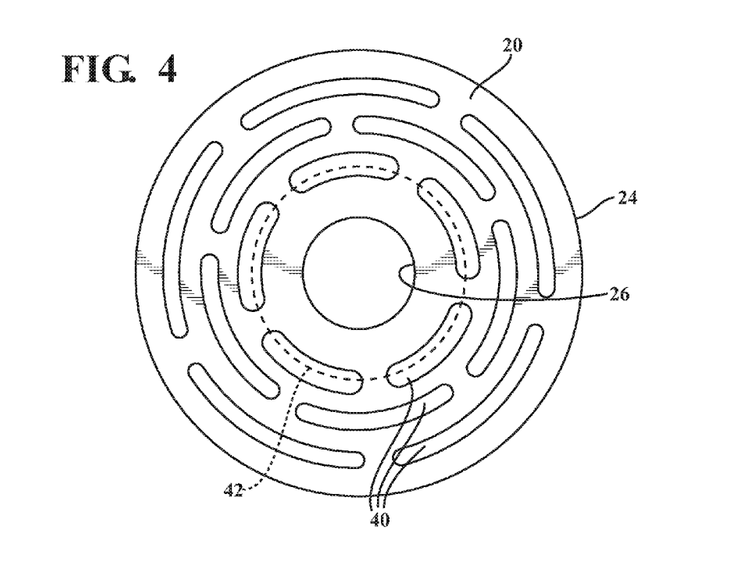
FIG. 4 a plan view of a washer of a heat and vibration mounting isolator of the heat shield assembly of FIG. 1.
Figure 5A:
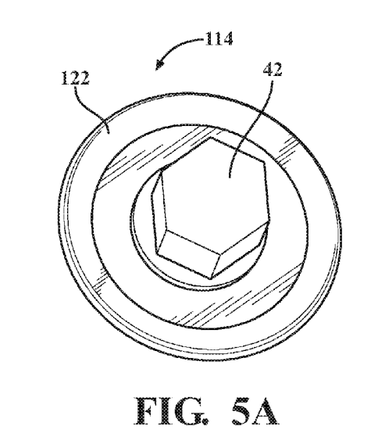
FIG. 5A a perspective view of a heat and vibration mounting isolator constructed in accordance with another aspect of the invention.
Figure 5B:
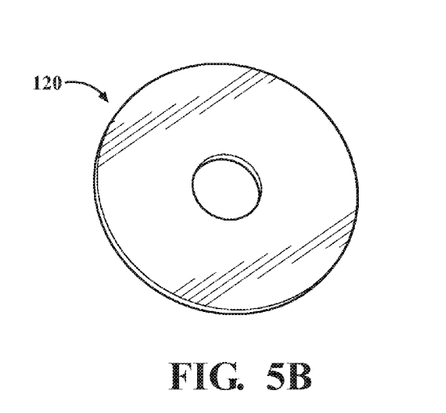
FIG. 5B a perspective view of a washer of the heat and vibration mounting isolator of FIG. 5A.
Figure 6A:
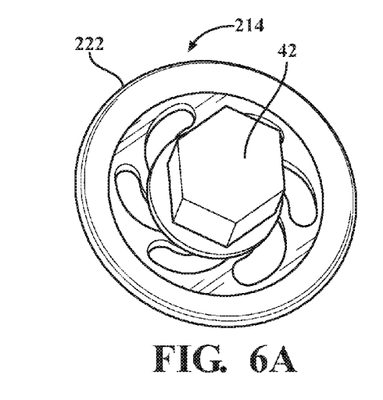
FIG. 6A a perspective view of a heat and vibration mounting isolator constructed in accordance with yet another aspect of the invention.
Figure 6B:
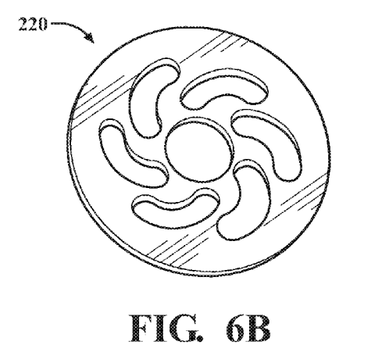
FIG. 6B a perspective view of a washer of the heat and vibration mounting isolator of FIG. 6A.
Figure 7A:
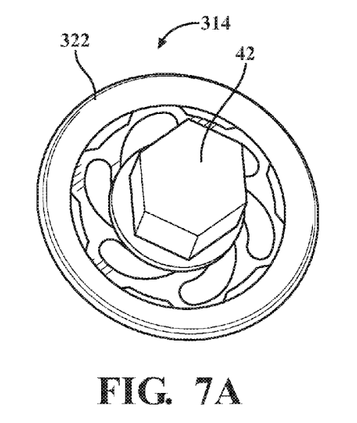
FIG. 7A a perspective view of a heat and vibration mounting isolator constructed in accordance with yet another aspect of the invention.
Figure 7B:
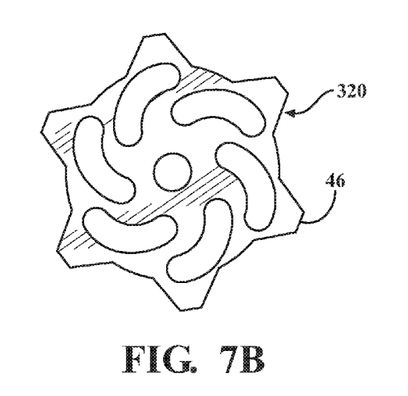
FIG. 7B a perspective view of a washer of the heat and vibration mounting isolator of FIG. 7A.
Figures 8A, 8B, 8C, 9:
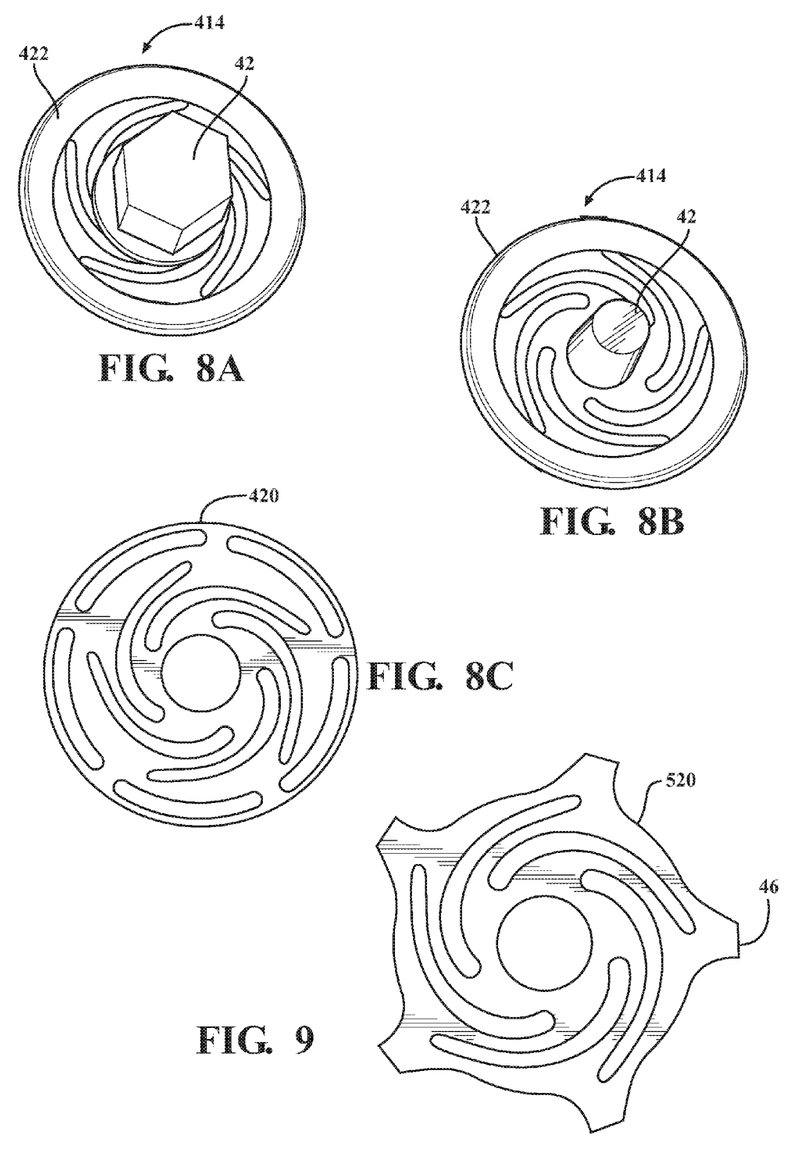
FIG. 8A is a top view of a heat and vibration mounting isolator constructed in accordance with yet another aspect of the invention.
FIG. 8B is a bottom view of the heat and vibration mounting isolator of FIG. 8A.
FIG. 8C is a plan view of a washer of the heat and vibration mounting isolator of FIG. 8A.
FIG. 9 is a plan view of a washer of a heat and vibration mounting isolator constructed in accordance with another aspect of the invention.
Figures 10A, 10B, 10C, 11A:
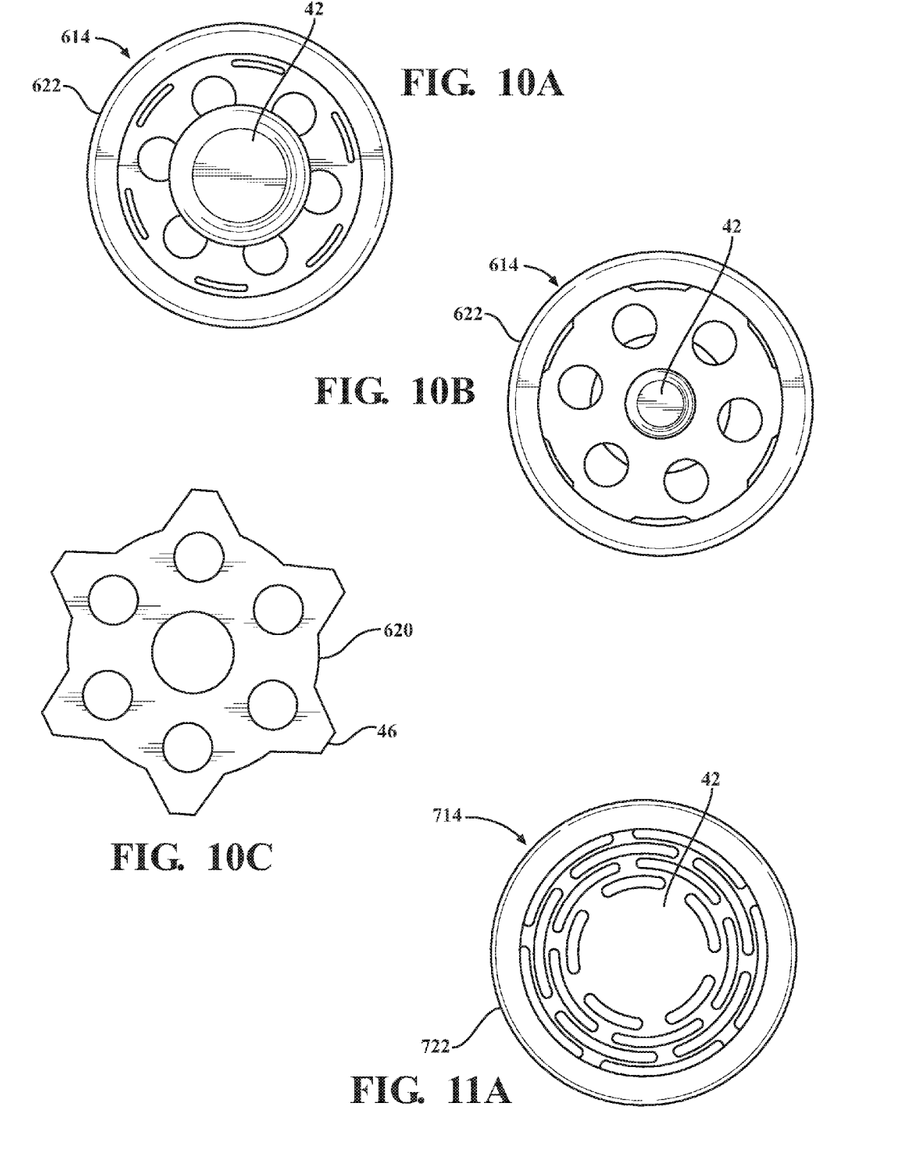
FIG. 10A is a top view of a heat and vibration mounting isolator constructed in accordance with yet another aspect of the invention.
FIG. 10B is a bottom view of the heat and vibration mounting isolator of FIG. 10A.
FIG. 10C is a plan view of a washer of the heat and vibration mounting isolator of FIG. 10A.
FIG. 11A is a top view of a heat and vibration mounting isolator constructed in accordance with yet another aspect of the invention.
Figure 11B:
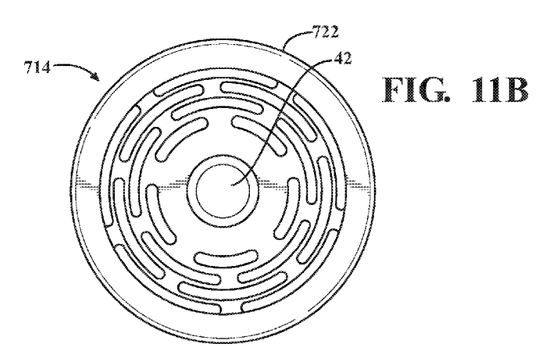
FIG. 11B is a bottom view of the heat and vibration mounting isolator of FIG. 11A.
Figure 11C:
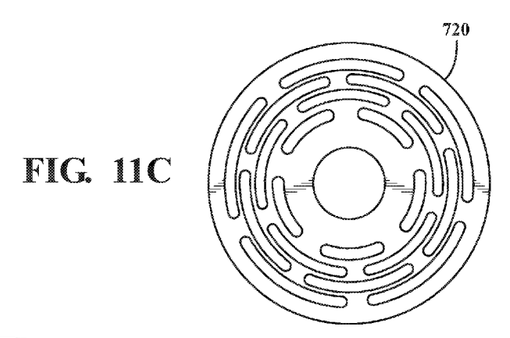
FIG. 11C is a plan view of a washer of the heat and vibration mounting isolator of FIG. 11A.

In the examples of FIGS. 3 and 4, the washer 20 includes a center ring formed of metal material surrounding the circular or non-circular center opening 26, and a plurality of rows of through openings 40 disposed radially outwardly of the center ring. Each through opening 40 extends circumferentially along a portion of the washer 20 and is circumferentially spaced from the adjacent through opening 40 by a spoke formed of the metal material. Each row of through openings 40 is radially spaced from the adjacent row by another ring of the metal material. In the embodiment of FIGS. 3 and 4, the washer 20 includes three rows of through openings 40, and each row includes five through openings 40 and five spokes. The circumferential length of each spoke is much less than the circumferential length of each through opening 40.

Figure 16:
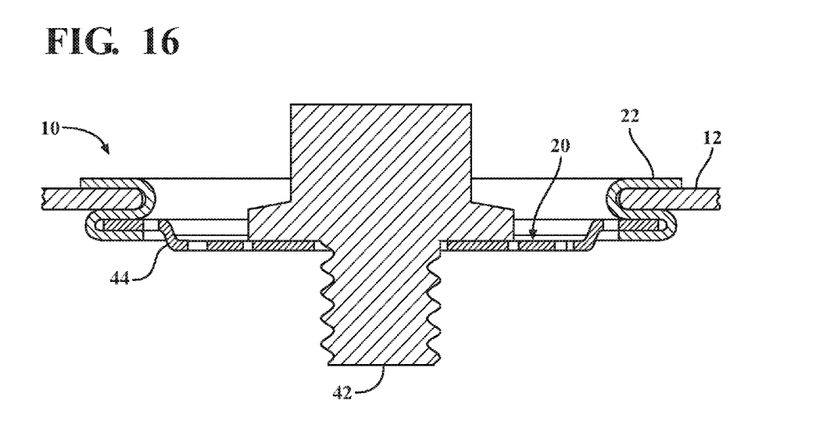
FIG. 16 is a cross-sectional side view of a heat and vibration mounting isolator constructed according to another embodiment, wherein the washer includes a bead, and a fastener is shown for attachment to a heat source.
Figure 17:
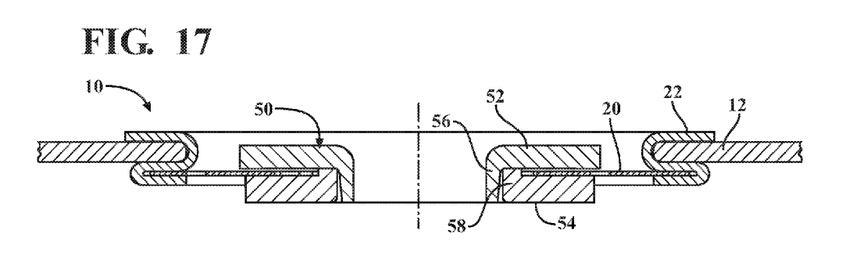
FIG. 17 is a cross-sectional side view of another example heat and vibration mounting isolator including a collar member along a center opening of the washer.
Figure 18:
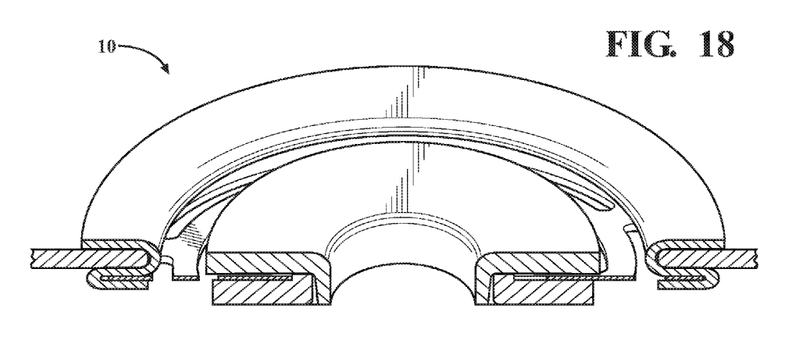
FIG. 18 is a perspective view of a portion of a heat and vibration mounting isolator including the collar member.
Figure 19:
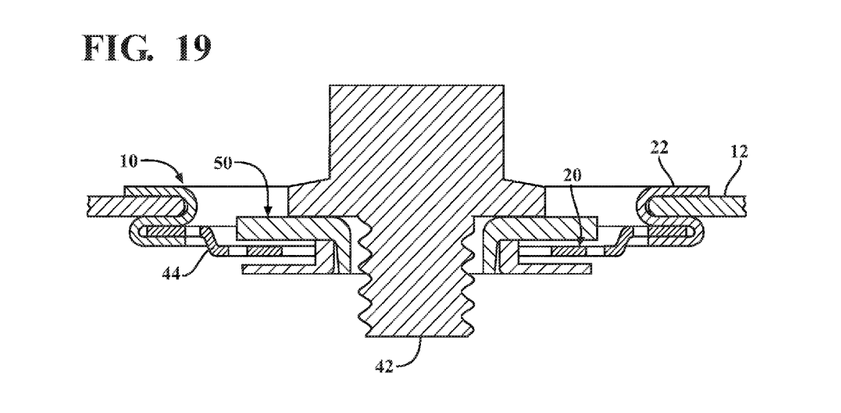
FIG. 19 is a cross-sectional side view of a heat and vibration mounting isolator including the collar member and a bead in the washer.
Figure 20:
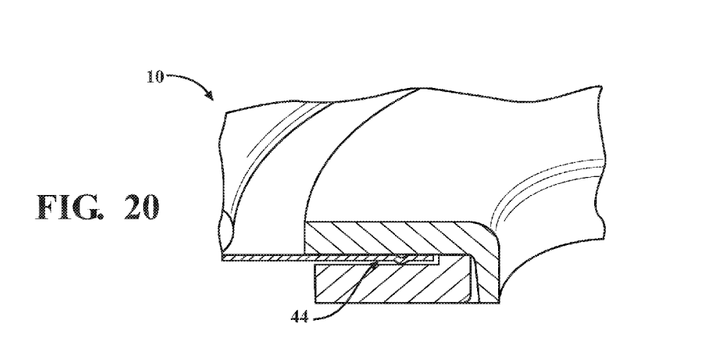
FIG. 20 is a perspective view of a portion of a heat and vibration mounting isolator including another bead profile in the washer.
Figure 21:
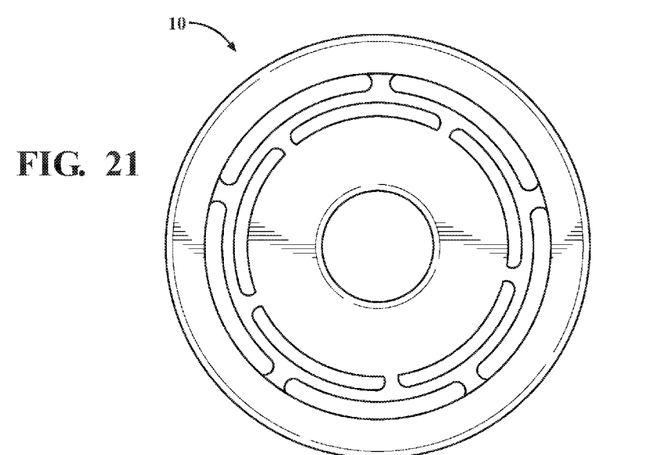
FIG. 21 illustrates a heat and vibration mounting isolator including the collar member; illustrate
Figure 22:
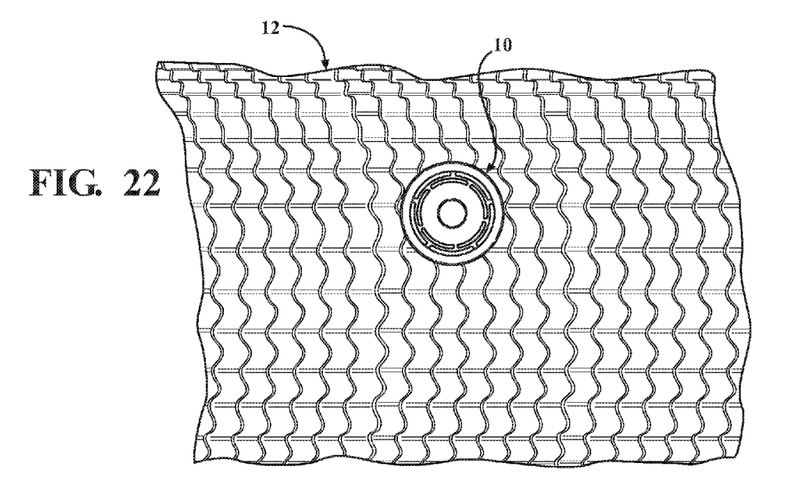
FIGS. 22 and 23 illustrate the heat and vibration mounting isolator of FIG. 21 attached to a heat shield.
Figure 23:
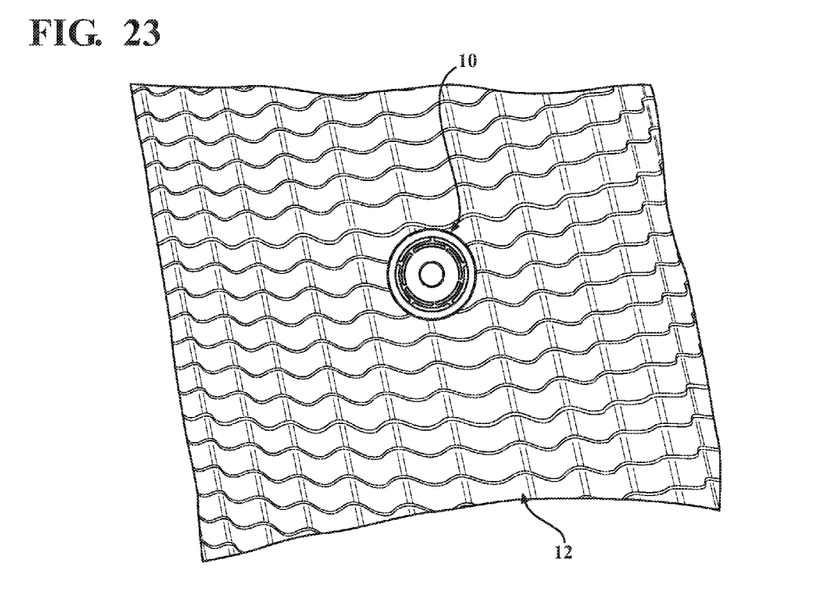

The washer 20 can be constructed having any desired thickness, as needed for the intended application, and can be planar, substantially planar, or can include at least one bead 44, also referred to as a stepped region, as shown in FIGS. 16, 19, and 20. The outer periphery 24 of the washer 20 can be formed as being circular or non-circular, symmetrical or non-symmetrical to best enhance vibration dampening, to minimize weight, and to minimize conductivity of the washer. For example, the washers depicted in FIGS. 9 and 10C include radially outwardly extending ears or tabs 46 of differing configurations, wherein the ears 46 are substantially the only portion of the washer clamped or sandwiched between the first end portion 30 and intermediate portion 34 of the housing 22, thereby further diminishing the conductive path between the fastener 42, the washer 20 and the housing 22, thereby reducing the potential of heat transfer therebetween. Further, as shown in FIG. 12, the through openings 40 can be provided as partially punched openings, thereby having tangs 48 of material remaining attached to the body of the washer 20. The tangs 48 can start from the inner diameter, outer diameter, or another position along the washer 20, and the number of tangs 48 is not limited to the number of through openings 40. The tangs 48 can also be circumferential, radial, or a combination of both, and are not limited to a planar surface. If provided, the tangs 48 can promote further dampening and can enhance the stiffness of the washer 20, wherein the tangs 48 can be formed to attain any desired size, shape, orientation and angle of inclination.

The housing 22 of the heat shield assembly 10 is preferably constructed of aluminum; however, it is contemplated that other metals could be used, such as various forms of steel, for example. The housing 22 can be formed being generally serpentine in axial cross-section, and depending on the view, either s or z-shaped, to minimize the envelope occupied by the housing 22 and to facilitate fixing the housing 22 to the washer 20 and the heat shield 12. The serpentine shape is formed as a result of the first end portion 30, the second end portion 32 and the intermediate portion 34 being folded in stacked, overlying relation with one another, much like an accordion.

Figure 24:
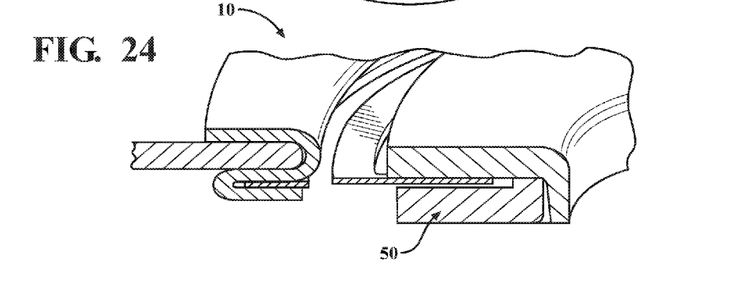
FIG. 24 is a perspective view of a portion of a heat and vibration mounting isolator including a single piece collar member.

According to other example embodiments shown in FIGS. 15-24, the heat shield assembly 10 includes a collar member 50 along the center opening 26 of the washer 20 to facilitate mounting of the assembly 10 to the heat source and further reduce the transfer of heat and vibrations from the heat source 10 to the heat shield 12. In the embodiments shown in FIGS. 15-24, the collar member 50 includes an upper collar 52 and a lower collar 54 maintaining the washer 20 therebetween. The upper collar 52 includes an inner neck 56 extending longitudinally along the center opening 26. The upper collar 52 then extends radially outward from the inner neck 56 along an upper surface of the washer 20. The lower collar 54 also includes an outer neck 58 extending longitudinally along the center opening 26. The lower collar 54 then extends radially outward from the outer neck 58 along a lower surface of the washer 20. The outer neck 58 is disposed radially outwardly of the inner neck 56. An outermost radial end of the upper collar 52 is approximately longitudinally aligned with an outermost radial end of the lower collar 54. Typically, there is some space between the washer 20 and the collar member 50, in the axial and/or radial direction, such that the washer 20 floats between the upper and lower collars 52, 54. In the embodiments of FIGS. 15-23, the upper and lower collars 52, 54 are separate pieces. Alternatively, the collar member 50 can comprise a single piece including both the upper and lower collars 52, 54, as shown in FIG. 24.

In the embodiments including the collar member 50, the washer 20 can include the bead 44, or a plurality of beads 44, to control the resistance of float of the collars 52, 54 relative to the clamped washer 20, so that the heat shield assembly 10 is easier to align and attach to the heat source. However, the beads 44 can also be used in embodiments without the collar member 50. The bead 44 minimizes thermal conduction, thus increasing thermal insulating efficiency of the assembly 10. The beads 44 can comprise a stepped profile, as shown in FIGS. 16 and 19, or a dome profile, as shown in FIG. 20. The dome-shaped beads 44 can be radially and circumferentially spaced from one another along the washer 20. Although only a couple bead profiles are shown, the bead 44 or beads can alternatively comprise other profiles, For example, the washer 20 can include a plurality of angularly, circumferentially spaced beads 44. The bead 44 can also be provided in the form of a rib. A bead 44 either circumferentially or radially shaped, or a combination thereof, creates a stiffness change in the washer 20 and thus enables fine tuning of the design.

The heat shield assembly 10 can also include a thermally resistant coating applied to the washer 20 to improve insulation and thus reduce heat transfer from the heat source to the heat shield 12. For example, a ceramic coating can be applied to the washer 20.

In accordance with another aspect of the invention, a method of constructing a heat shield assembly 10 is provided. The method includes providing a heat shield 12 having a through opening 16 bounded by an inner periphery 18; providing a washer 20 having an outer periphery 24 and a center opening 26 extending about a central axis 28, and providing an annular housing 22 having opposite first and second end portions 30, 32 and an intermediate portion 34 extending between the first and second end portions 30, 32. The method further includes curling the first end portion 30 of the housing 22 radially inwardly toward the central axis 28 in overlying relation with the intermediate portion 34 to form a first annular pocket 36 opening toward the central axis 28 and fixedly capturing the outer periphery 24 of the washer 20 in the first annular pocket 36. The method also includes curling the second end portion 32 radially outwardly away from the central axis 28 in overlying relation with the intermediate portion 34 to form a second annular pocket 38 opening away from the central axis 28 and fixedly capturing the inner periphery 18 of the heat shield 12 in the second annular pocket 38.

To form the assembly 10 of FIGS. 15-24, the method further includes disposing the washer 20 between the upper and lower collars 52, 54, either before or after clamping the housing 22 onto the washer 20. When the collar member 50 includes the separate upper and lower collars 52, 54, opposed to a single piece design, the method also includes fixing the collars 52, 54 to one another.

Obviously, many modifications and variations of the present invention are possible in light of the above teachings. It is, therefore, to be understood that the invention may be practiced otherwise than as specifically described while still being within the scope of the invention.

The invention claimed is:

1. An isolator for damping heat and vibrations between a heat shield and heat source, the isolator comprising:
a housing surrounding a center opening, said housing extending axially from a first end portion to a second end portion and including an intermediate portion therebetween;
said first end portion of said housing extending radially inwardly to form a first annular pocket between said first end portion and said intermediate portion, said first annular pocket facing said center opening;
said second end portion of said housing extending radially outwardly to form a second annular pocket between said second end portion and said intermediate portion, said second annular pocket facing away from said center opening for receiving the heat shield;
a washer extending radially from an outer periphery received in said first annular pocket of said housing to said center opening for receiving a fastener to connect the heat shield to the heat source; and
said washer including a plurality of through openings between said outer periphery and said center opening for enhancing vibration dampening and minimizing heat transfer from the heat source to the heat shield;
wherein said washer includes a center ring formed of metal material surrounding said center opening and a plurality of rows of said through openings disposed radially outwardly of said center ring and spaced from the adjacent row by another ring of said metal material.

2. The isolator of claim 1, wherein said first end portion, said second end portion, and said intermediate portion of said housing extend parallel to one another; said first end portion is curled radially inwardly and said second end portion is curled radially outwardly; and said outer periphery of said washer is clamped between said first end portion and said intermediate portion of said housing.

3. The isolator of claim 1, wherein said housing is formed of aluminum and said washer is formed of steel.

4. The isolator of claim 1, wherein said washer includes an inner diameter presenting said center opening, and said inner diameter includes a plurality of tabs each spaced from the adjacent tab by a groove.

5. The isolator of claim 1, wherein said outer periphery of said washer is provided by a plurality of radially outwardly extending tabs, and said tabs are received in said first annular pocket of said housing.

6. The isolator of claim 1, wherein said through openings are provided as partially punched openings including tangs of material attached to a remaining body portion of said washer.

7. The isolator of claim 1, wherein said washer includes at least one bead.

8. The isolator of claim 1 including a ceramic coating applied to said washer.

9. The isolator of claim 1 including a collar member disposed along said center opening of said washer for facilitating mounting of the isolator to the heat source, said collar member extending axially from an upper collar to a lower collar and maintaining said washer therebetween.

10. The isolator of claim 9, wherein said upper collar includes an inner neck extending axially along said center opening, and said upper collar extends radially outward from said inner neck along an upper surface of said washer; said lower collar includes an outer neck extending longitudinally along said center opening, and said lower collar extends radially outward from said outer neck along a lower surface of said washer.

11. The isolator of claim 10, wherein said upper collar and said lower collar are separate pieces, and said outer neck of said lower collar is disposed radially outward of said inner neck of said upper collar.

12. The isolator of claim 10, wherein said upper collar and said lower collar comprise a single piece of material.

13. The isolator of claim 9 including a space filled with air between said washer and said collar member.

14. The isolator of claim 9, wherein said collar member includes at least one bead.

15. The isolator of claim 1, wherein said first end portion, said second end portion, and said intermediate portion of said housing extend parallel to one another;
   said first end portion is curled radially inwardly and said second end portion is curled radially outwardly;
   said outer periphery of said washer is clamped between said first end portion and said intermediate portion of said housing,
   said washer includes a center ring formed of metal material surrounding said center opening and a plurality of rows of said through openings disposed radially outwardly of said center ring and spaced from the adjacent row by another ring of said metal material;
   said housing is formed of aluminum and said washer is formed of steel; and
   further including a collar member disposed along said center opening of said washer for facilitating mounting of the isolator to the heat source;
   said collar member extending axially from an upper collar to a lower collar and maintaining said washer therebetween;
   said upper collar including an inner neck extending axially along said center opening, and said upper collar extending radially outward from said inner neck along an upper surface of said washer; and
   said lower collar including an outer neck extending longitudinally along said center opening, and said lower collar extending radially outward from said outer neck along a lower surface of said washer.

16. The assembly of claim 15 including a collar member disposed along said center opening of said washer for facilitating mounting of said isolator to the heat source, said collar member extending axially from an upper collar to a lower collar and maintaining said washer therebetween.

17. A heat shield assembly for attachment to a heat source by a fastener, the assembly comprising:
   a heat shield including a through opening presented by an inner periphery;
   an isolator received in said through opening of said heat shield for damping heat and vibrations between said heat shield and the heat source, said isolator comprising:
   a housing surrounding a center opening, the center opening being axially aligned with said through opening of said heat shield;
   said housing extending axially from a first end portion to a second end portion and including an intermediate portion therebetween;
   said first end portion of said housing extending radially inwardly to form a first annular pocket between said first end portion and said intermediate portion, said first annular pocket facing said center opening;
   said second end portion of said housing extending radially outwardly to form a second annular pocket between said second end portion and said intermediate portion, said second annular pocket facing away from said center opening and receiving said inner periphery of said heat shield;
   a washer extending radially from an outer periphery received in said first annular pocket of said housing to said center opening for receiving the fastener to connect said heat shield to the heat source; and
   said washer including a plurality of through openings between said outer periphery and said center opening for enhancing vibration dampening and minimizing transfer of heat from the heat source to said heat shield;
   wherein said washer includes a center ring formed of metal material surrounding said center opening and a plurality of rows of said through openings disposed radially outwardly of said center ring and spaced from the adjacent row by another ring of said metal material.

18. An isolator for damping heat and vibrations between a heat shield and heat source, the isolator comprising:
   a housing surrounding a center opening, said housing extending axially from a first end portion to a second end portion and including an intermediate portion therebetween;
   said first end portion of said housing extending radially inwardly to form a first annular pocket between said first end portion and said intermediate portion, said first annular pocket facing said center opening;
   said second end portion of said housing extending radially outwardly to form a second annular pocket between said second end portion and said intermediate portion, said second annular pocket facing away from said center opening for receiving the heat shield;
   a washer extending radially from an outer periphery received in said first annular pocket of said housing to said center opening for receiving a fastener to connect the heat shield to the heat source; and
   said washer including a plurality of through openings between said outer periphery and said center opening for enhancing vibration dampening and minimizing heat transfer from the heat source to the heat shield;
   wherein said washer includes an inner diameter presenting said center opening, and said inner diameter includes a plurality of tabs each spaced from the adjacent tab by a groove.

19. An isolator for damping heat and vibrations between a heat shield and heat source, the isolator comprising:
   a housing surrounding a center opening, said housing extending axially from a first end portion to a second end portion and including an intermediate portion therebetween;
   said first end portion of said housing extending radially inwardly to form a first annular pocket between said first end portion and said intermediate portion, said first annular pocket facing said center opening;
   said second end portion of said housing extending radially outwardly to form a second annular pocket between said second end portion and said intermediate portion, said second annular pocket facing away from said center opening for receiving the heat shield;
   a washer extending radially from an outer periphery received in said first annular pocket of said housing to said center opening for receiving a fastener to connect the heat shield to the heat source; and
   said washer including a plurality of through openings between said outer periphery and said center opening for enhancing vibration dampening and minimizing heat transfer from the heat source to the heat shield;

wherein said outer periphery of said washer is provided by a plurality of radially outwardly extending tabs, and said tabs are received in said first annular pocket of said housing.

\* \* \* \* \*